Figure 6:
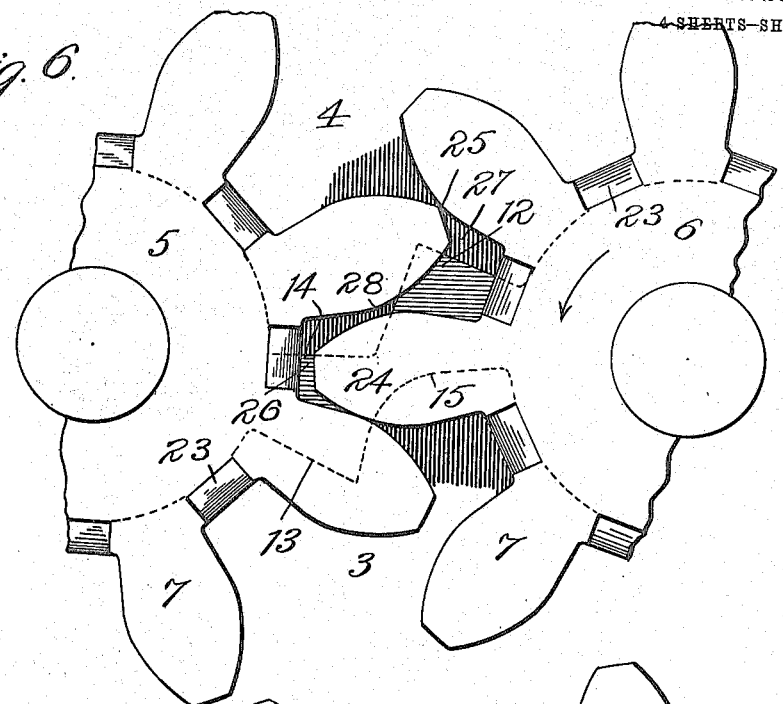

W. G. HAWLEY.
GEAR PUMP.
APPLICATION FILED APR. 8, 1914.
1,129,090.
Patented Feb. 23, 1915.
4 SHEETS—SHEET 1.
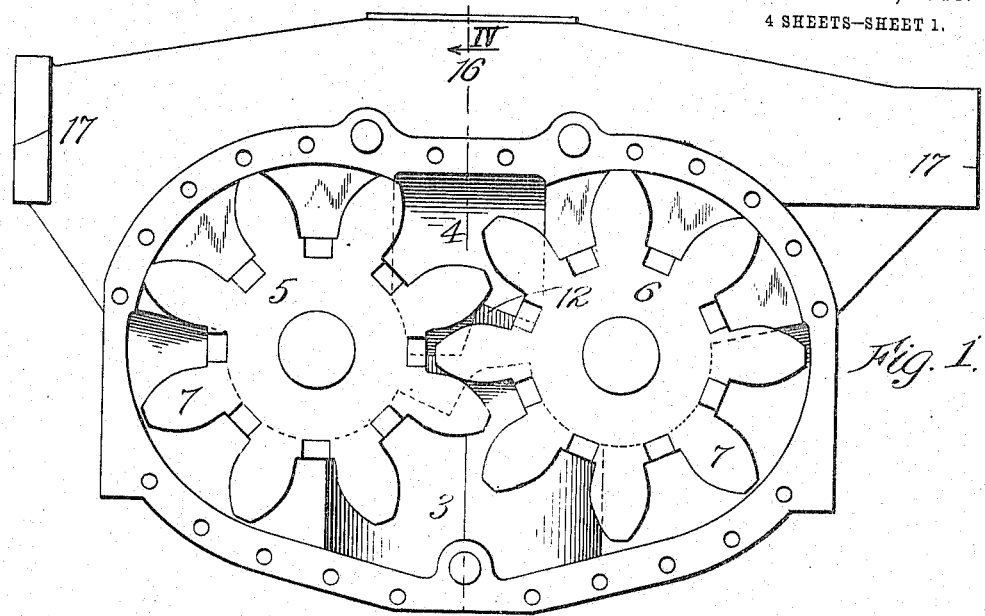
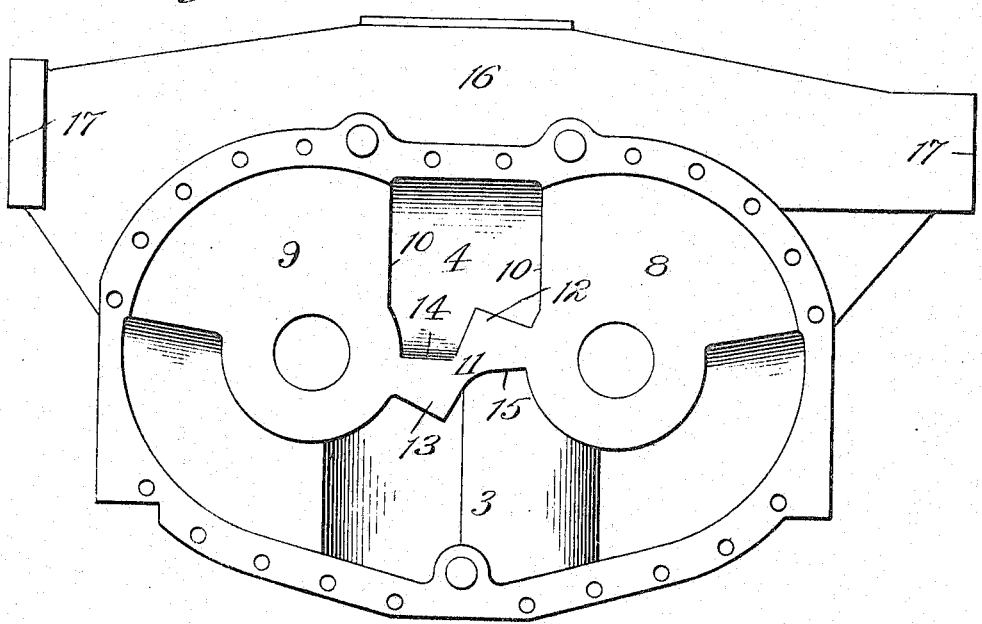

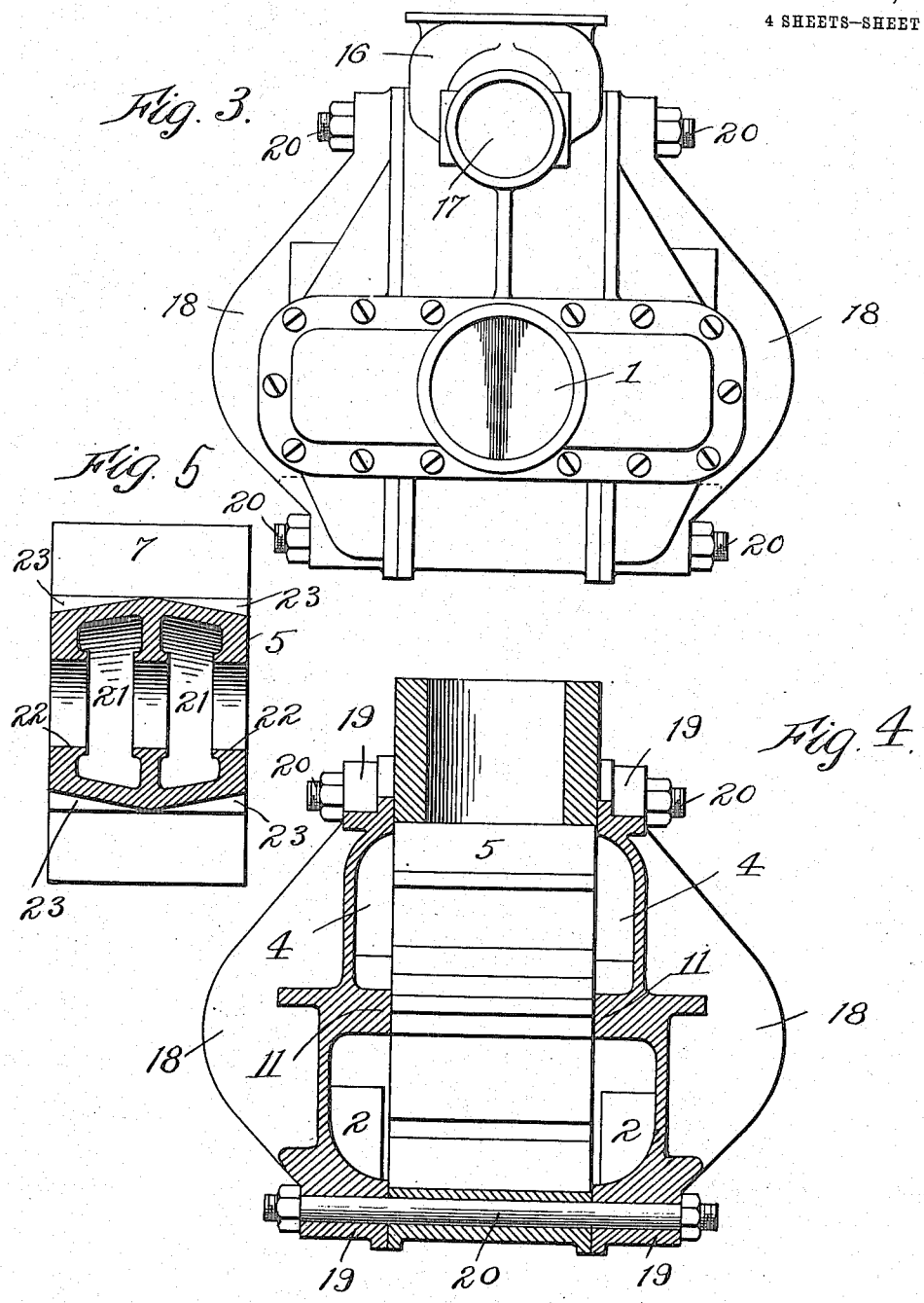

W. G. HAWLEY.
GEAR PUMP.
APPLICATION FILED APR. 8, 1914.

1,129,090.

Patented Feb. 23, 1915.
4 SHEETS—SHEET 3.

W. G. HAWLEY.
GEAR PUMP.
APPLICATION FILED APR. 8, 1914.

1,129,090.

Patented Feb. 23, 1915.
4 SHEETS—SHEET 4.

Witnesses:
Wm. A. Courtland
A. B. Wright.

Inventor
Wm. G. Hawley
By his Attorneys

UNITED STATES PATENT OFFICE.

WILLIAM G. HAWLEY, OF ELMIRA, NEW YORK, ASSIGNOR TO AMERICAN LA FRANCE FIRE ENGINE COMPANY, INC., OF ELMIRA, NEW YORK, A CORPORATION OF NEW YORK.

GEAR-PUMP.

1,129,090.   Specification of Letters Patent.   Patented Feb. 23, 1915.

Application filed April 8, 1914. Serial No. 830,475.

*To all whom it may concern:*

Be it known that I, WILLIAM G. HAWLEY, a citizen of the United States, and resident of Elmira, county of Chemung, and State of New York, have invented certain new and useful Improvements in Gear-Pumps, of which the following is a full and clear specification.

This invention relates to rotary pumps in which coöperating elements are provided with intermeshing portions. More especially, the present invention is concerned with pumps of this character in which the contours of the intermeshing portions conform more or less closely with gear teeth of conventional outline.

The primary object of the invention is to provide an improved construction, combination and arrangement of parts in and around the suction and pressure chambers of rotary pumps having intermeshing portions for the purpose of overcoming certain inherent difficulties usually met with in gear pumps. Thus when two gears are intermeshing, each driving tooth as it contacts with a driven tooth forms a space between the line of contact and the line of contact existing between the preceding teeth, the only openings to this space being those at the ends of the teeth on the flat sides of the gears. As this space approaches the surface which is common to the axes of rotation of the gears, its volume is gradually reduced to a minimum at the plane of axes. During the operation of the pump water is confined in each of these spaces and if, for any reason, there are not ample outlets for releasing the fluid, the volume of each space tends to decrease more rapidly than the outflow thereform will permit. In consequence there results a considerable power loss to overcome which constitutes the main object of the present invention. Thus I provide a construction according to which the interdental space between the contact points of two successive pairs of teeth remains in open communication, with the pressure chamber until the volume of such space is substantially reduced to a minimum, said space being opened up to the suction chamber prior to any appreciable increase in volume on that side so as to break the vacuum which would otherwise occasion a drag on the pumping elements.

Certain collateral objects of invention reside in the form of the interdental spaces in relation to the formation of the housing walls adjacent the plane of the axes of rotation.

Other and further objects will appear in the specification and be specifically pointed out in the appended claims, reference being had to the accompanying drawings, in which,—

Figure 7:
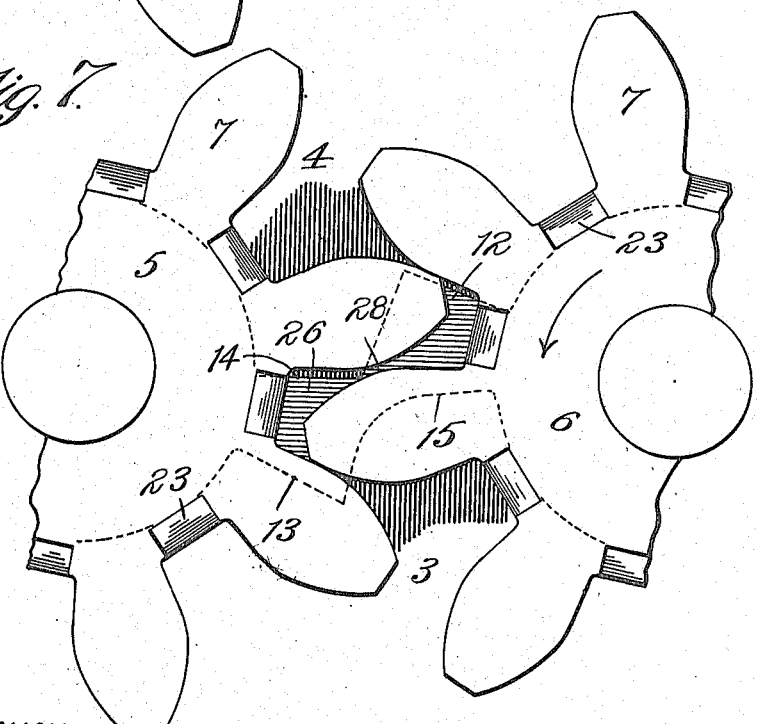
Figure 8:
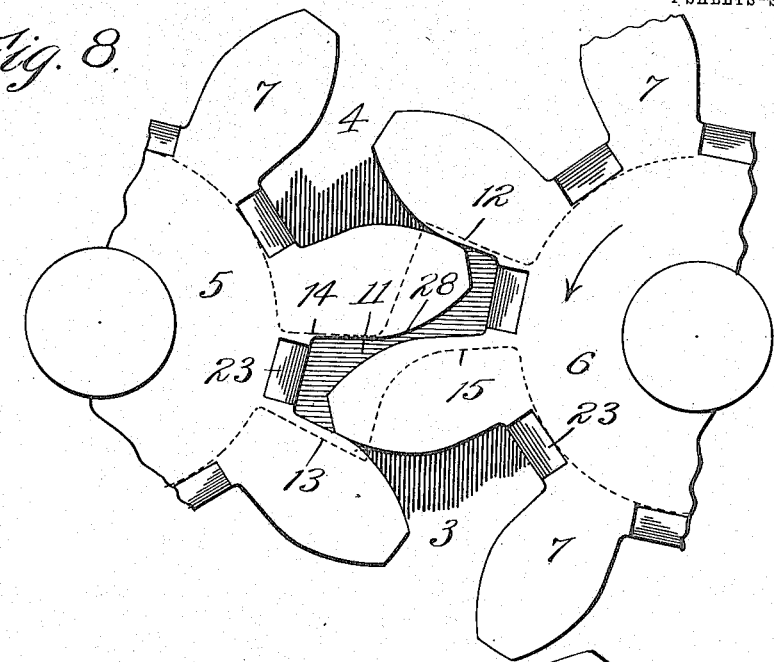
Figure 9:
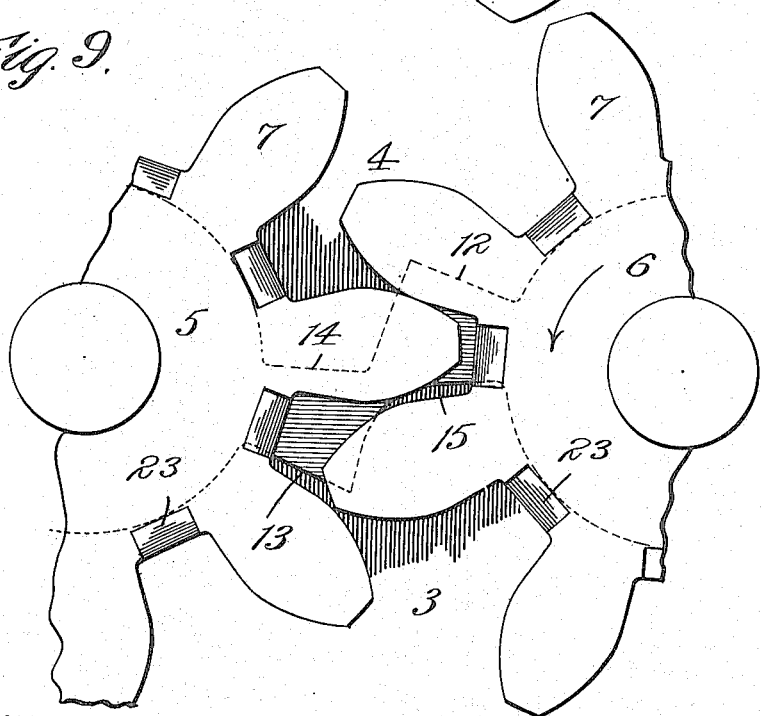

Figure 1 is a side elevation of the preferred embodiment of my invention, one cover of the housing being removed to show the interior; Fig. 2 is a similar side elevation with the pumping gears removed; Fig. 3 is an end elevation of the same; Fig. 4 is a section on the line IV—IV, Fig. 1; Fig. 5 is an axial section of one of the gears removed; Fig. 6 is a fragmentary side elevation of the gears on an enlarged scale showing the relative positions of said gears at the instant the interdental space is closed from above; Fig. 7 is a similar fragmentary side elevation showing side gears with the interdental space reduced to a minimum in volume and still in open communication with the pressure chamber; Fig. 8 is a similar view showing the interdental space closed to the pressure chamber as well as the suction chamber; Fig. 9 is a similar view showing the interdental space opening into the suction chamber.

Referring more particularly to the drawings and to the embodiment shown therein, the pump housing is provided with an inlet opening 1 at each end thereof, which branches to communicate with channels 2 on either side which lead to a suction chamber 3 as pointed out in my copending application, Serial Number 830,476, of even date. The suction chamber 3 as well as a pressure chamber 4 extends throughout the width of the pump housing, being of greater extent than the width of the rotary pumping elements 5 and 6. The intermeshing portions of said pumping elements are preferably constructed as gear teeth 7 of conventional form, such as will adapt one of said gears to drive the other. In the present instance, the gear 6 drives the gear 5, power being applied to gear 6 in any suitable manner. As pointed out in the above mentioned copending application, each of the opposite lateral walls of the housing is provided with surfaces 8 and 9 which substantially contact with the lateral faces of the gears 6 and 5, each of said walls terminating in a vertical edge 10 above the plane which is common to the axes of rotation of said gears. The wall portions 8 and 9 on either side have a part in common, namely, the bridge 11 which embodies a portion 12 projecting into the pressure chamber on the driver side and a portion 13 projecting into the suction chamber 3 on the side of driven gear 5. From an inspection of Fig. 2, it will be seen that the bridge 11 is provided with an edge 14 substantially in the plane of the axes. Preferably this edge is disposed slightly below said plane for the purpose to be hereinafter explained. Similarly said bridge is provided on the suction side with an edge 15 which is somewhat removed from the plane of axes. Above the pressure chamber 4, the housing is provided with a gallery 16 having discharge outlets 17 at either end. As pointed out in the above mentioned copending application, the side walls of the housing are provided with stiffening webs 18 which extend from top to bottom between a plurality of sockets 19 within which are seated the transverse bolts 20 which pass therethrough, said bolts being also passed through corresponding holes in the central part of the housing. As shown best in Fig. 5, each of the pumping gears is preferably constructed with chambers 21 within its hub and having spaced bearing portions 22 by means of which it is secured to the shaft which carries it. Extending laterally from each side of the central plane of the gear are grooves 23 which deepen outwardly to provide ready outlets from the interdental spaces to be hereinafter referred to. It will be understood in this connection that in pumps of this description, the face of the tooth is comparatively broad in comparison to the diameter of the gear for the purpose of enlarging the capacity of the spaces between adjacent teeth. Furthermore, it is desirable to have as small a number of teeth in each gear as is consistent with smooth running and efficiency in power transmission. I have ascertained by experiment that a pair of gears of this character in which each is provided with eight teeth produce the best results in connection with the features of my invention now to be described.

Referring more especially to Figs. 6 to 9 inclusive, 6 being the driving gear and 5 the driven gear, said gears will be in contact along the line indicated by 24 in Fig. 6. Also the pair of teeth next above are just coming in contact at 25. Owing to backlash which is invariably present in gears in practical operation, the lines 24 and 25 will determine the lower and upper elements respectively of an interdental space, the lower portion 26 of which is approximately bisected by the plane of axes and the upper portion of which is considerably above said plane. These portions are connected by the backlash space 28. As shown in Fig. 6, the line of contact 25 is above the upper edge of the portion 12 of the bridge. Furthermore, it will be seen that the edge 14 of said bridge is substantially central with respect to the portion 26 of the interdental space, thus leaving ample outlet for the entrapped fluid to be expelled from said interdental space during the period of time during which said space is approaching its central position with respect to the plane of axes and during which said space is gradually decreasing in volume. Thus, as shown in Fig. 7, by the time the volume of said space is reduced to a minimum there yet remains a slight opening into the pressure chamber from said space. In consequence of the fluid being thus released as the space grows smaller, there will be no appreciable choking effects tending to stall the pump. As the interdental space travels downwardly, it will increase in volume toward the suction chamber and if in this event there were no opening provided for at a relatively early stage of this movement, a partial vacuum would be created in such interdental space which would act as a drag on the pumping elements. To break this vacuum it will be seen from Fig. 9 that the edge 15 of the bridge 11 extends above the upper surface of the lower tooth, so that fluid from the suction chamber 3 is admitted to the interdental space, said fluid serving to break the vacuum as the volume of the space increases. At the same time, the lower edge of the portion 13 of the bridge 11 has permitted the portion 26 of said space to communicate with the suction chamber 3. By means of this construction, I have obtained a very high degree of efficiency in connection with fire engine pumps.

The operation and advantages of my improved pump are obvious from the foregoing description.

I claim:

1. In a pump, rotary pumping elements having intermeshing portions, a housing for said pumping elements providing suction and pressure chambers of greater lateral extent than said pumping elements, and a bridge interposed between said chambers and slidably abutting the end faces of said intermeshing portions, the portion of said bridge which bears on the meshing portions of one of said rotary elements being extended farther into one of said chambers than the portion which bears against the meshing portions of the other rotary element.

2. In a pump, rotary pumping elements having intermeshing portions, a housing for said pumping elements providing suction and pressure chambers of greater lateral extent than said pumping elements, and a bridge interposed between said chambers and slidably abutting the end faces of said intermeshing portions, said bridge being provided with portions contiguous to said rotary elements respectively, one of said portions being extended farther into said suction chamber than the other.

3. In a pump, rotary pumping elements having intermeshing portions, a housing for said pumping elements providing suction and pressure chambers of greater lateral extent than said pumping elements, and a bridge interposed between said chambers and slidably abutting the end faces of said intermeshing portions, the portion of said bridge which bears on the meshing portions of one of said rotary elements being extended farther into said pressure chamber than does the portion of said bridge which bears against the meshing portions of the other of said rotary elements.

4. In a pump, rotary pumping elements having intermeshing portions, and a housing for said pumping elements providing suction and pressure chambers on opposite sides of the line of centers of said rotary elements, one of said chambers being of greater lateral extent than said rotary elements, the edge of said chamber on the side next the line of centers being constructed to diverge from the line of centers toward one of said pumping elements.

5. In a pump, rotary pumping elements having intermeshing portions, and a housing for said pumping elements providing suction and pressure chambers on opposite sides of the line of centers of said rotary elements, one of said chambers being of greater lateral extent than said rotary elements, the edge of said chamber extending along the line of centers adjacent one of said pumping elements and diverging from adjacent the other of said rotary elements.

6. In a gear pump, a pair of intermeshing gears which constitute the pumping elements, a housing for said gears, provided with suction and pressure chambers with which the interdental spaces of said gears are adapted to communicate, said pressure chamber being provided with spaces which communicate with said interdental spaces at points nearer to the line of centers adjacent to one of said gears than the other.

7. In a gear pump, a pair of intermeshing gears which constitute the pumping elements, a housing for said gears, provided with suction and pressure chambers with which the interdental spaces of said gears are adapted to communicate through the ends of said spaces, and a wall in said pressure chamber which closes the ends of said spaces in one of said gears as they approach the line of centers, said pressure chamber being open to the interdental spaces of the other gear adjacent to said line of centers, the contour of said wall corresponding to the line described by a point of contact between two contacting teeth of said gears.

8. In a gear pump, a pair of intermeshing gears which constitute the pumping elements, a housing for said gears provided with suction and pressure chambers with which the interdental spaces of said gears are adapted to communicate through the ends of said spaces, a wall in said pressure chamber which closes the ends of said spaces in one of said gears as they approach the line of centers, said pressure chamber being open to the interdental spaces of the other gear adjacent to said line of centers, and a wall in said suction chamber which closes said spaces in the other gear as they recede from the line of centers, the contour of said walls corresponding in general outline to the line described by a point of contact between two contacting teeth of said gears.

9. In a gear pump, a pair of intermeshing gears which constitute pumping elements, a housing for said gears having suction and pressure chambers with which the interdental spaces of said gears are adapted to communicate through the ends of said spaces, and a wall in said suction chamber which covers the ends of said spaces in one of said gears as they recede from the line of centers, the contour of said wall approximately conforming in general outline with the locus of the points of contact between said gears.

10. In a gear pump, intermeshing gears constituting the pumping elements, a housing therefor provided with suction and pressure chambers, of greater width than said gears, and a bridge interposed between said chambers and having a wall slidably abutting said gears adjacent the line of centers, said bridge forming an edge of the pressure chamber adjacent the line of centers on one side of the line of thrust and extending away from said line of centers on the opposite side of the thrust line.

11. In a gear pump, intermeshing gears constituting the pumping elements, a housing therefor provided with suction and pressure chambers of greater width than said gears, and a bridge interposed between said chambers and having a wall slidably abutting said gears adjacent the line of centers, said bridge forming an edge of the pressure chamber adjacent the line of centers on one side of the line of thrust and extending away from said line of centers on the opposite side of the thrust line, said bridge forming an edge to the suction chamber which extends adjacent to the line of centers on said opposite side of the line of thrust away from the line of centers on the first said side.

12. In a gear pump, driving and driven gears constituting the pumping elements, a housing therefor provided with suction and pressure chambers of greater width than said gears, and a bridge interposed between said chambers between the axes of rotation of said gears, said bridge having a portion extending into the pressure chamber adjacent to the driving gear and a portion extending into the suction chamber adjacent to the driven gear.

13. In a gear pump, driving and driven gears constituting the pumping elements, a housing therefor provided with suction and pressure chambers of greater width than said gears, and a bridge interposed between said chambers between the axes of rotation of said gears, said bridge having a portion extending into the pressure chamber adjacent to the driving gear and a portion extending into the suction chamber adjacent to the driven gear, said gears being relatively broad faced compared to their diameter and the bottom walls of the interdental spaces being provided with grooves extending from the center of the gear toward the lateral faces of said gears.

14. In a gear pump, driving and driven gears constituting the pumping elements, a housing therefor provided with suction and pressure chambers of greater width than said gears, and a bridge interposed between said chambers between the axes of rotation of said gears, said bridge having a portion extending adjacent to the driving gear and a portion extending into the suction chamber adjacent to the driven gear, each of said gears being provided with eight teeth.

15. In a gear pump, driving and driven gears intermeshing to constitute pumping elements, a housing for said gears provided with suction and pressure chambers of greater width than said gears, bearing bosses projecting from the lateral walls of said housing, said gears being journaled in said bosses slidably contacting therewith, the bottom walls of the interdental spaces being provided with grooves deepening toward the lateral faces of the gears, the bottom walls of said grooves terminating approximately flush with the outer walls of said bearing bosses.

WILLIAM G. HAWLEY.

Witnesses:
G. J. NAGEL,
K. J. WILLIAMS.